United States Patent
Koike et al.

[11] Patent Number: 5,117,287
[45] Date of Patent: May 26, 1992

[54] HYBRID CODING SYSTEM FOR MOVING IMAGE

[75] Inventors: Atsushi Koike; Masahide Kaneko, both of Tokyo; Yoshinori Hatori, Kanagawa, all of Japan

[73] Assignee: Kokusai Denshin Denwa Co., Ltd., Tokyo, Japan

[21] Appl. No.: 664,181

[22] Filed: Mar. 1, 1991

[30] Foreign Application Priority Data

Mar. 2, 1990 [JP] Japan .................. 2-49506

[51] Int. Cl.⁵ .......................... H04N 7/12; H04N 7/13
[52] U.S. Cl. .................................. 358/133; 358/135; 358/136; 382/56; 382/50
[58] Field of Search ................. 358/133, 135, 136, 85, 358/105; 382/50, 56; 379/52, 53, 100

[56] References Cited

U.S. PATENT DOCUMENTS

| | | |
|---|---|---|
| 4,796,087 | 1/1989 | Guichard et al. ............... 358/136 |
| 4,922,341 | 5/1990 | Strobach ......................... 358/136 |
| 4,951,140 | 8/1990 | Ueno et al. ..................... 358/136 |
| 4,999,705 | 3/1991 | Puri et al. ....................... 358/136 |

OTHER PUBLICATIONS

CS89-82—"A Hybrid Coding Method of Analysis Parameters and Waveform in Image Data Compression'—Institute of Electronics, Information and Communication Engineers in Japan, Nov. 1989.
B-I, vol. J72-B-I, No. 3, pp. 200-207, Mar. 1989—"A Model-Based Analysis Synthesis Image Coding Scheme"—Institute of Electronics, Information and Communication Engineers in Japan.
IE89-3—"Estimation of 3-D Motion of Head from Moving Facial Images"—Institute of Electronics, Information and Communication Engineers in Japan, Apr. 1989.

Primary Examiner—James J. Groody
Assistant Examiner—Michael Lee
Attorney, Agent, or Firm—Armstrong & Kubovcik

[57] ABSTRACT

A moving image is coded through a waveform coding predictor (2), and a model-based coding predictor (3) which is mainly applicable to a head portion of a person, the coded outputs of said two predictors are compared (5) with an input current image for each block element which has for instance 8×8 or 16×16 pixels. A block element coded for the smaller difference from an input current image is taken, and is transmitted to a receiving side through differential coding (6,7). As the information compression ratio is high, a moving image can be transmitted through conventional telephone line, or a narrow band circuit.

3 Claims, 11 Drawing Sheets

HYBRID CODING SYSTEM FOR MOVING IMAGE

BACKGROUND OF THE INVENTION

The present invention relates to an interframe prediction coding of a image utilized in a tele-conference, and/or a video telephone, in particular, the present invention relates to a hybrid coding system which combines a waveform coding prediction system, and a model-based coding prediction system which uses three dimensional shape model (3-D shape model).

The conventional systems for a coding system for a moving image are a prediction coding system, a transform coding system, and an interframe coding with motion compensated prediction system. Those conventional systems are waveform coding using statistical characteristics of an image.

The motion of an image is detected for each block element in an image, and the area for detection is restricted to the two dimensional plane. On the other hand, those systems have no restriction for an object to be coded. Each block element has for instance 8×8 pixels or 16×16 pixels.

On the other hand, a model-based coding prediction system which uses a three dimensional shape model of an object is considered to be promising. As it uses a three dimensional shape model, an object to be coded is limited, but it has the advantages that it provides higher information compression ratio as compared with said waveform coding prediction system.

In a model-based prediction system, an object is covered with a mesh which has many triangular cells. The opening of an eye, or a lip, for instance, is presented by the modification of coordinates on said mesh, and is represented by some parameters. In one embodiment, motion of an eye is represented by eight parameters (16 parameters for a pair of eyes), motion of a lip is represented by eight parameters, and motion of a whole head is represented by six parameters, and thus, motion of a head is represented by 30 parameters in total. An image is transmitted by a still image at first, and said parameters for modifying an image. In a preferred embodiment, 15 frames may be transmitted in a second by using 2 kbits of transmission line.

A hybrid coding system which uses both of said systems is now proposed (for instance, IE89-82, pages 13-18, November, 1989, in the Institute of Electronics, Information, and Communication Engineers in Japan, entitled "A hybrid coding method of analysis parameters and waveform in image data compression."

Figure 8:
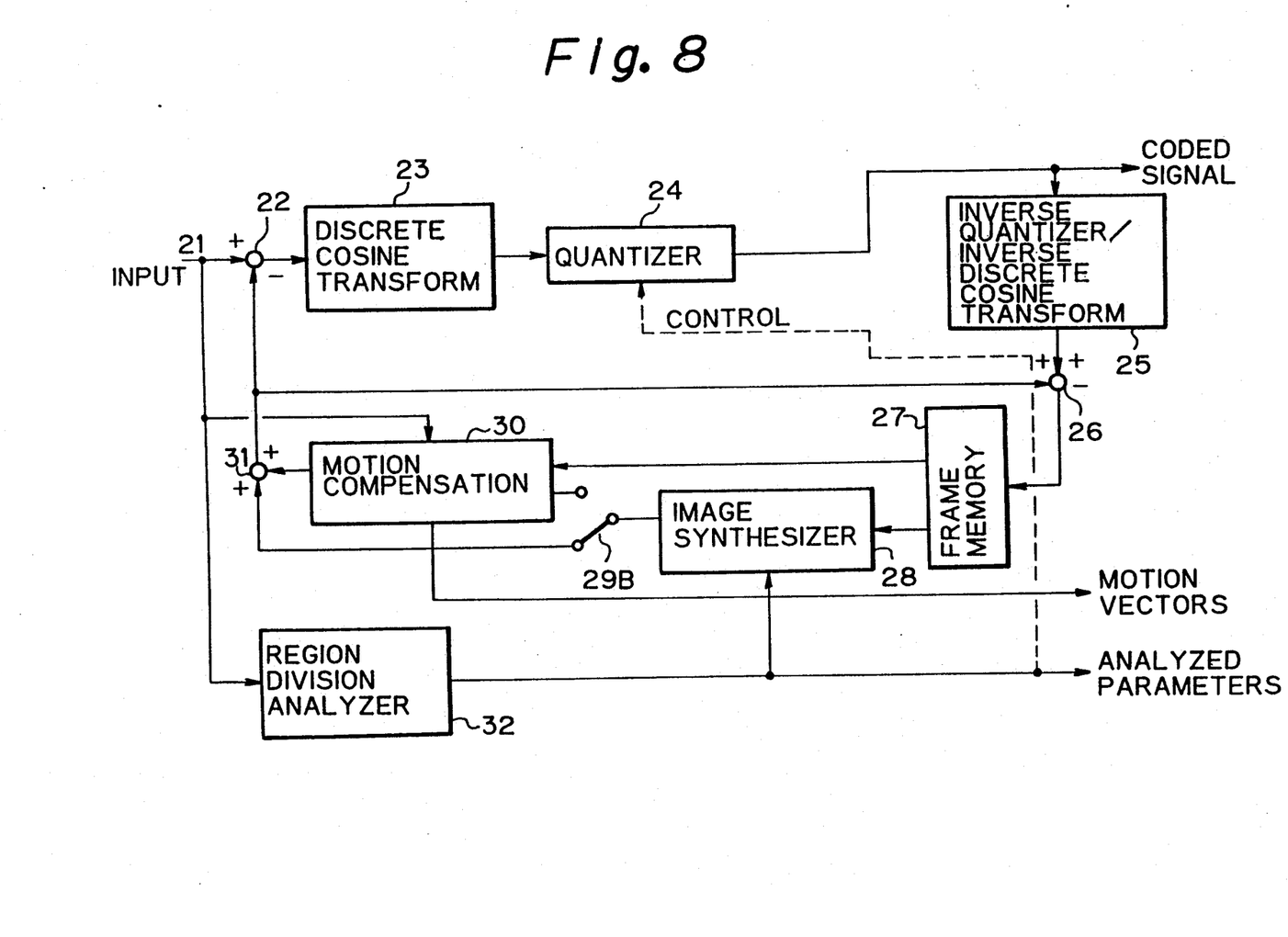
FIG. 8 is a block diagram of a prior hybrid coding system.

That prior system is described in accordance with FIG. 8.

In FIG. 8, the numeral 21 is an image input terminal, 27 is a frame memory, 22 is a subtractor, 26 is an adder, 32 is a region division analyzer, 30 is a motion compensation portion, 28 is an image synthesizer, 23 is a discrete cosine transform (DCT), 24 is a quantizer, 25 is an inverse quantizer/inverse discrete cosine transform, and 29 is a signal switch.

It uses a motion compensated on prediction in two dimensional plane for each block element, and a discrete cosine transform system as waveform coding prediction system. As a model-based coding system, it uses analysis/synthesis coding system using three dimensional shape model of an object (which is a head of a person in the embodiment). The latter is described in detail in J72-B-I, No. 3, pp. 200-207, in the Institute of Electronics, Information and Communication Engineers in Japan, March, 1989, entitled "A model-based analysis synthesis image coding scheme". The intensity information on surface of a shape model may be either an intensity information of a first frame, or an intensity information of a decoded image of a previous frame. The latter case which uses a decoded image of a previous frame is now described.

An input image at the input terminal 21 is applied to the region division analyzer 32, which divides an image into a background portion and a head portion of a person which is moving, and also analyzes the motion and/or the location of the head portion. The image synthesizer 28 synthesizes an image of a head portion by providing intensity information which is decoded image of a previous frame stored in the frame memory 27, to three dimensional shape model of a head portion according to the information provided by the region division analyzer.

The switch 29 is connected to the contact A when the synthesized portion is further subjected to motion compensated prediction, or to the contact B when that portion is not subjected to motion compensated prediction.

When the switch is connected to the contact A, the motion compensation portion 30 generates the picture of the sum of the background portion of the decoded image of the previous frame stored in the frame memory 27, and the head portion obtained in the synthesizer 28, and provides the predicted image by effecting the motion compensated prediction for an input image by using said sum.

When the switch is connected to the contact B, the motion compensated prediction is carried out for a background portion, and no prediction is carried out for a synthesized head portion.

The adder 31 provides the predicted image which is the sum of the background portion and the head portion. The subtractor 22 provides the prediction error which is the difference between the current input image at the terminal 21 and the predicted image. The obtained prediction error is subjected to discrete cosine transform in the DCT portion 23, and the quantization in the quantizer 24. The quantized result is subjected to encoding. The quantized result is subjected to inverse quantization and inverse discrete cosine transform in the portion 25, the output of which is added to the predicted image in the adder 26. The output of the adder 26 is stored in the frame memory 27.

However, the prior art of FIG. 8 has the following disadvantages.

When the switch 29 is connected to the contact A, the sum of the background portion of the previous frame, and the head portion obtained in the synthesizer 28 is first obtained, and secondly the predicted image is obtained by effecting the motion compensation for said sum image. Therefore, the prediction efficiency of the predicted image for an input image is not high, and the information compression ratio is also not high.

Figure 9:
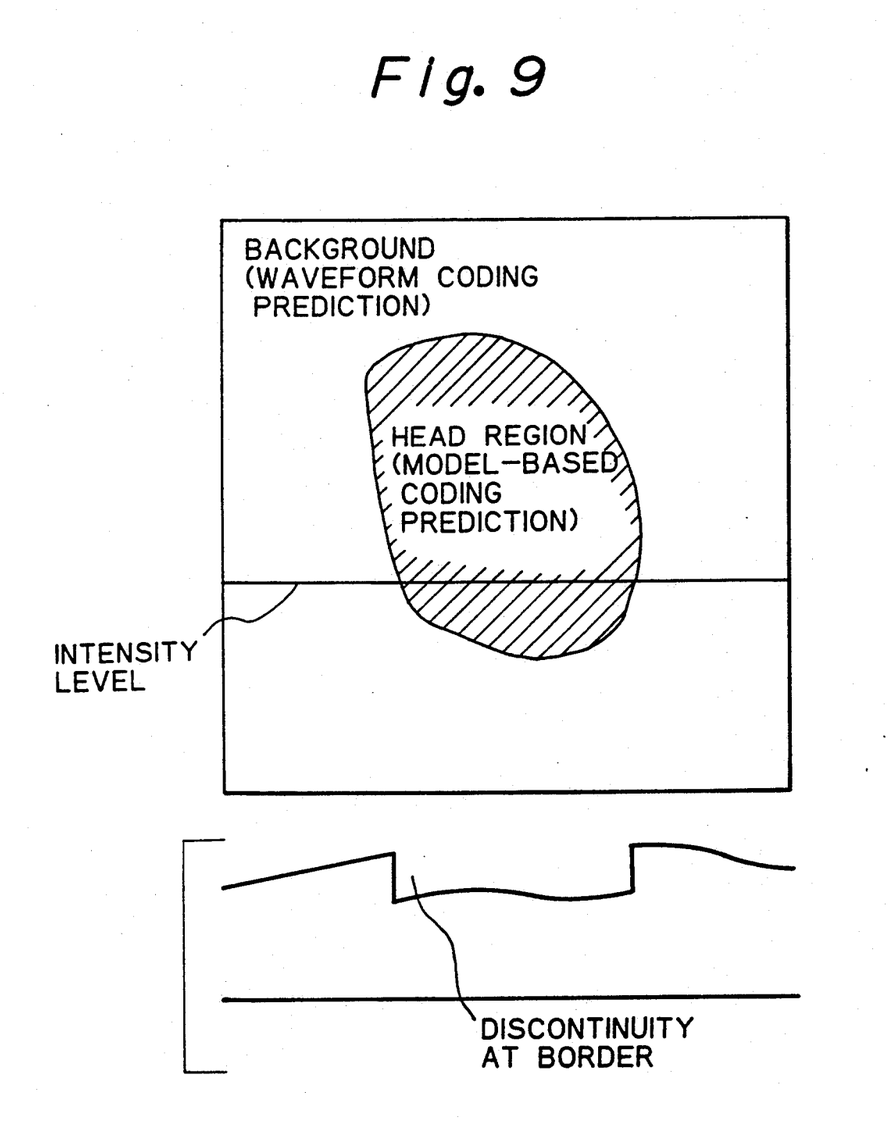
FIG. 9 shows the discontinued intensity at the border of a background and a head.

When the switch 29 is connected to the contact B, the prediction efficiency is not high by the similar reason. Further, the intensity of an image is discontinuous at the border of the prediction areas of the waveform coding system and the model-based coding system, as shown in FIG. 9. This results in undesired block noise in a reproduced image.

SUMMARY OF THE INVENTION

It is an object of the present invention to provide a new and improved hybrid coding system for a moving image by overcoming the disadvantages and limitations of prior coding systems for a moving image.

It is also an object of the present invention to provide a hybrid coding system for a moving image with high prediction efficiency and high information compression ratio.

It is also an object of the present invention to provide a hybrid coding system for a moving image with a smoothed image, irrespective of the switching of two coding systems.

The above and other objects are attained by a hybrid coding system for moving image with combination of waveform coding prediction system and three dimensional shape model prediction system comprising; an input terminal (1) for receiving a current input image which is subjected to coding and transmission; a frame memory (4) storing a previous image frame; a model-based coding predictor (3) for analyzing an object in a current input image, by using an image of a previous frame stored in said frame memory (4), a current input image, and a three dimensional shape model of the object; a wavefrom coding predictor (2) for predicting an image for a current input image by using waveform coding prediction system by using a current input image and an output of said frame memory (4); an image comparator (5) for obtaining first difference between an input image and an output of said model-based coding predictor (3), and second difference between an input image and an output of said waveform coding predictor (2), and providing an output image which relates to the smaller difference; a subtractor (6) for providing difference between an input image and an output of said image comparator (5); a coding means (7) for encoding an output of said subtractor (6); a decoding means (8) for decoding an output of said coding means (7); an adder (9) for providing sum of an output of said decoding means (8) and output of said image comparator (5), and providing the sum to said frame memory (4); and an output terminal (A, B, C) for providing coded output (A) from said coding means (7), motion vectors (B) from said waveform coding predictor (2), and motion and shape change information (C) from said model-based coding predictor (3).

BRIEF DESCRIPTION OF THE DRAWINGS

The foregoing and other objects, features, and attendant advantages of the present invention will be appreciated as the same become better understood by means of the following description and accompanying drawings wherein.

DESCRIPTION OF THE PREFERRED EMBODIMENTS

Some embodiments which are directed to motion of a head or a face of a person are described below.

EMBODIMENT 1

Figure 1:
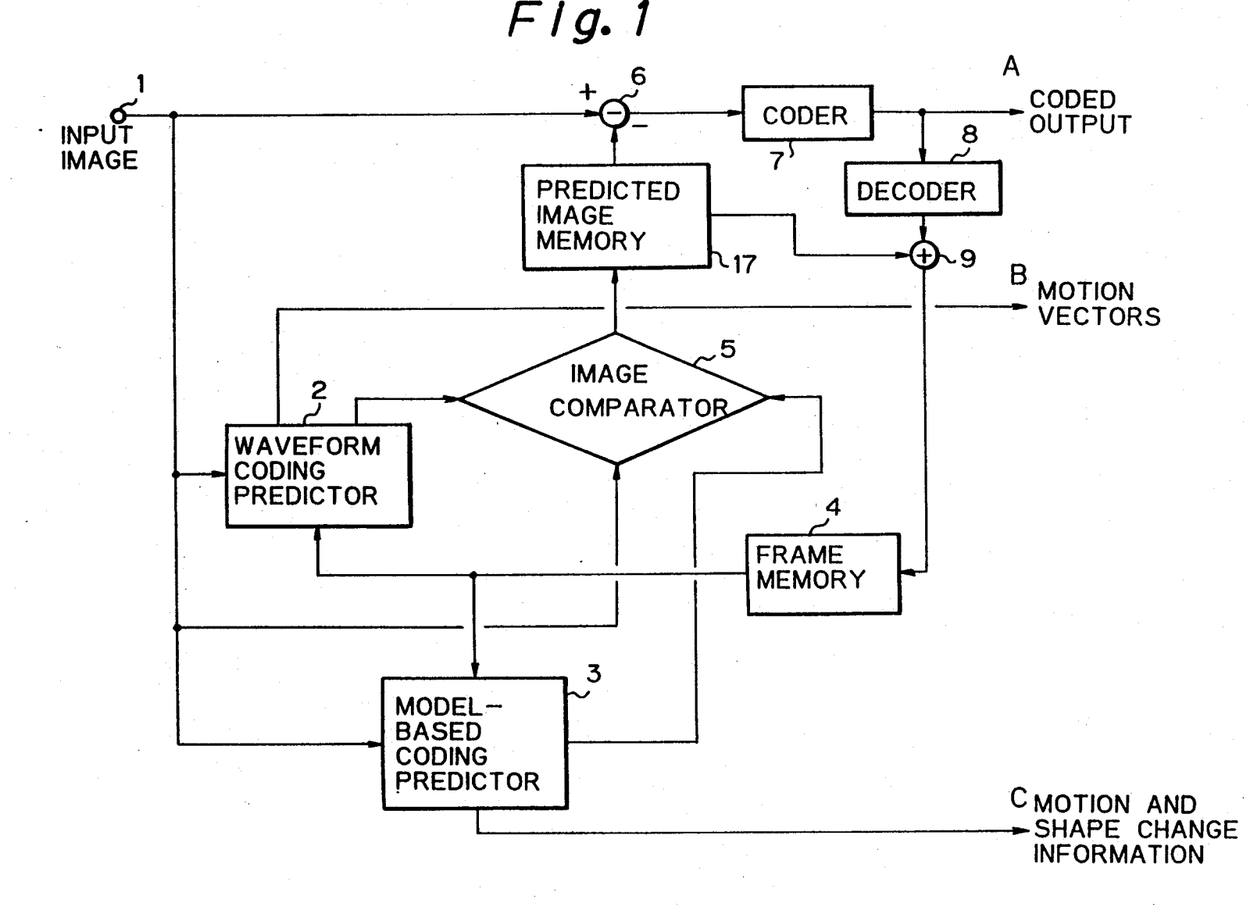
FIG. 1 is a block diagram of the hybrid coding system of a moving image according to the present invention.

FIG. 1 shows a block diagram of a hybrid coding system for a moving image according to the present invention. In the figure, the numeral 1 is an input terminal of an input image (picture), 2 is a waveform coding predictor, 3 is a model-based coding predictor, 4 is a frame memory, 5 is an image comparator, 6 is a subtractor, 7 is a coder, 8 is a decoder, 9 is an adder, and 17 is a predicted image memory.

The model-based coding predictor 3 analyzes shape, location, and/or motion of an object (for instance a head of a person) by using an input image from the input terminal 1, and a previous image frame which is stored in the frame memory 4, and further synthesizes the image of the head portion by using the result of said analysis, and the three dimensional shape model.

The waveform coding predictor 2 provides the predicted image relating to an input image by using, for instance, a motion compensated prediction method, which is described, for instance, in IE81-54, Institute of Electronics, Information, and Communication Engineers in Japan, July 1981 entitled "Motion compensated inter-frame coding for a tele-conference signal". The motion of each block element of an input image for a previous frame image is detected, and the motion vectors in horizontal direction and vertical direction are obtained. A predicted image is obtained by reading an image block at the location defined by said motion vectors in the frame memory 4.

The image comparator 5 compares each block element of an input image with that of an output of the waveform coding predictor 2, and also compares each block element of an input image with that of an output of the model-based coding predictor 3. The image comparator 5 provides the image output which has smaller difference from an input image in said two comparisons. The image output of the comparator 5 is stored in the memory 17.

The subtractor 6 provides the prediction error which is the difference between a predicted image which is an output of the image comparator 5 stored in the predicted image memory 17, and an input image. The prediction error is encoded in the coder 7, and is transmitted to a receiving side.

The output of the coder 7 is decoded in the decoder 8. The sum of the output of the decoder 8 and the output of the memory 17 provided in the adder 9 is stored in the frame memory 4.

The transmit signal to a receiving side is the coded signal A which is the output of the coder 7, and the motion vectors B and the motion and shape change information C. When the waveform coding predictor is selected, the signals A and B are transmitted. When the model-based coding predictor is selected, the signals A and C are transmitted. The signal C is parameters showing motion of eyes, mouth, and a whole head.

The model-based coding predictor 3 is now described. The model-based coding has been known, for instance, J71-B, No. 12, pages 1554-1560, December 1988, in the Institute of Electronics, Information, and Communication Engineers in Japan, entitled "Coding of facial images based on 3-D model of head and analysis of shape changes in input image sequence". The model-based coding predictor is based upon the process and the modification of the three dimensional shape model of an object. The three dimensional shape model is consisted of wire frame model having small triangular elements. The three dimensional shape model of an object is projected on a two dimensional plane, and the intensity information and/or the color information is provided to each triangular element. The motion and/or deformation of an object is detected by using an input image, and by using the result of the same, the three dimensional shape model is processed, so that the image corresponding to an input image is synthesized. The result of the model-based prediction is in the form of some parameters which show the motion of eyes, a mouth, and/or a whole head.

Figure 2:
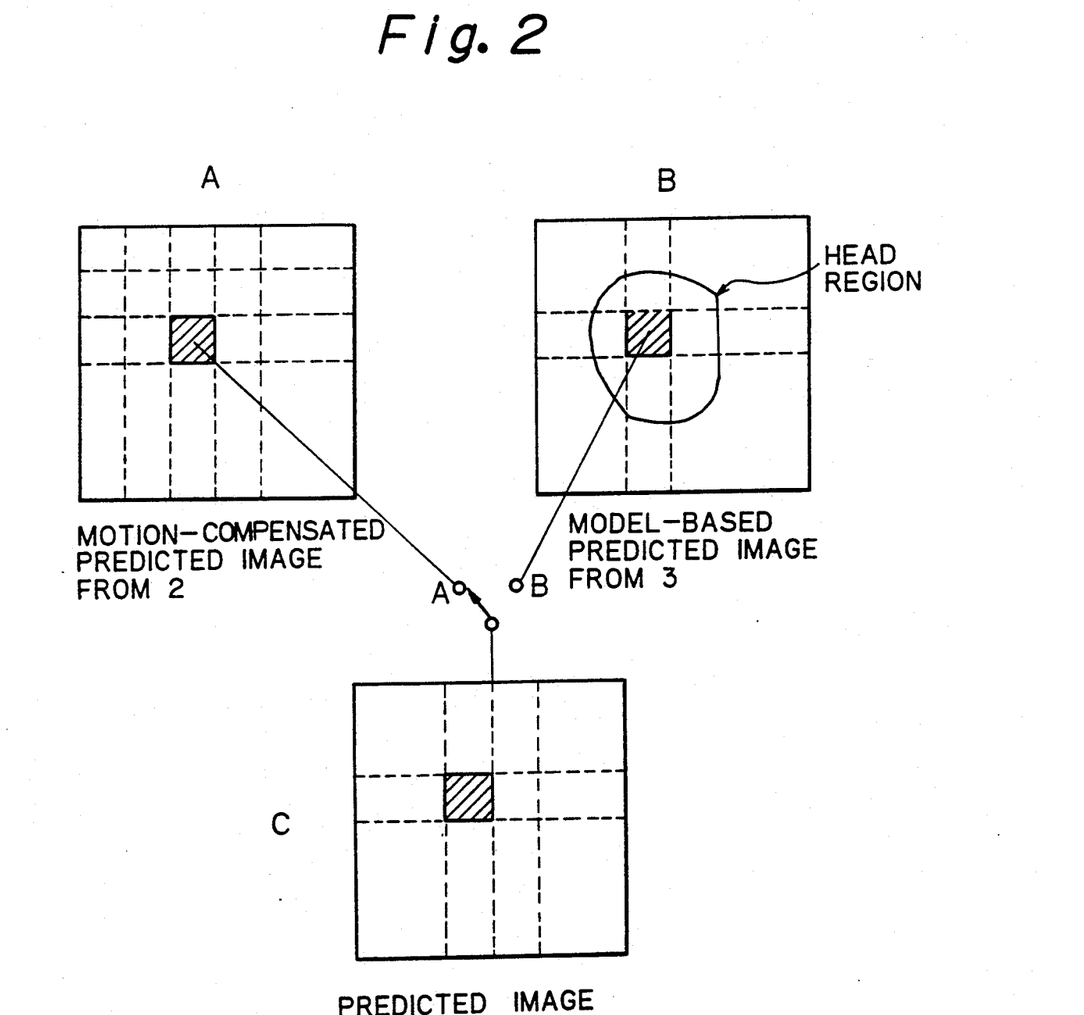
FIG. 2 shows the explanation of the image comparator 5 in FIG. 1.
Figure 3:
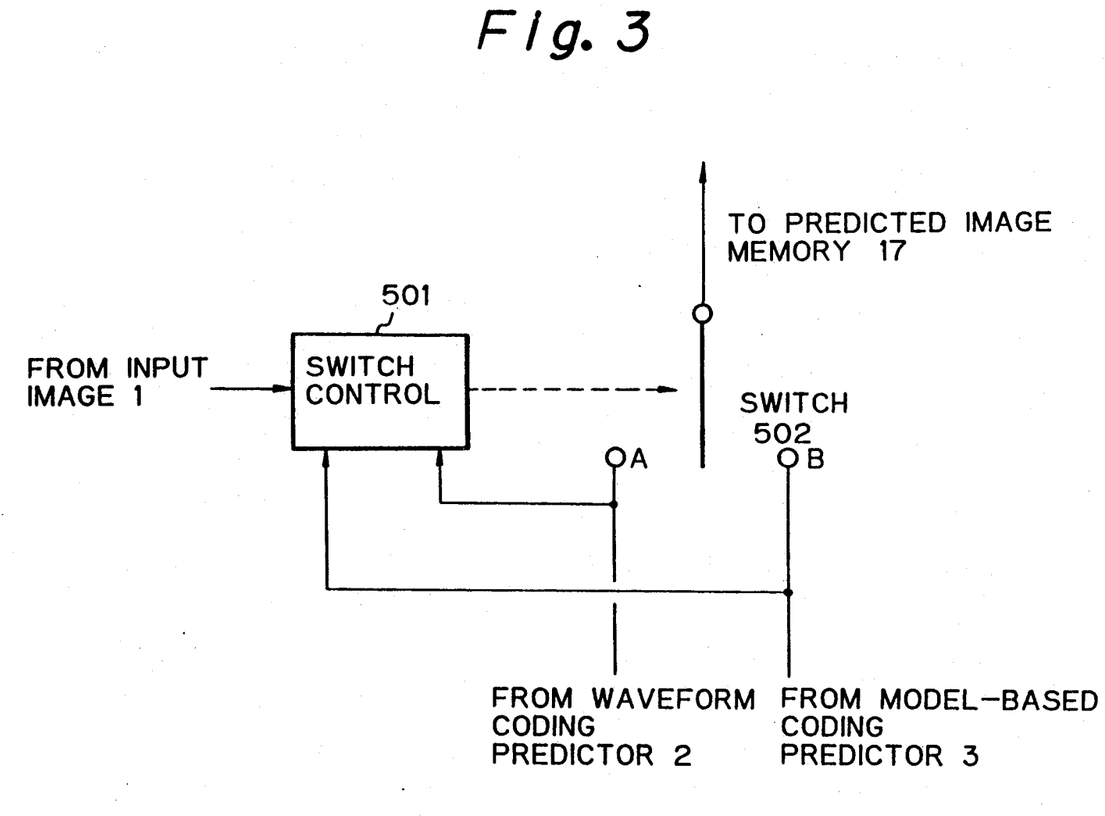
FIG. 3 is a block diagram of the image comparator, FIG. 4AB is the block diagram of the second embodiment of the present hybrid coding system.

Next, the image comparator 5 is described. FIG. 2 shows the operation of the image comparator 5, and FIG. 3 shows a block diagram of the image comparator. In FIG. 2, the picture A shows the waveform coding predicted image obtained in the waveform coding predictor 2, the picture B shows the model-based coding image obtained in the model-based coding predictor 3, and the picture C shows the output of the image switch 502. The comparison of the picture A and the picture B is effected for each block element which has for instance 8×8 pixels. A block element in the image A is compared with an input image, and a block element in the image B is also compared with an input image. Either a block in the image A or a block in the image B is selected so that the difference from a block in an input image is smaller. The resultant predicted image is shown in C, which is the combination of blocks A and blocks B.

The image comparator 5 has a switch 502 and the switch control 501. The switch 502 is connected either to the contact A or the contact B, according to the control of the switch control 501. The contact A relates to the case that the output of the waveform coding predictor is selected as a predicted image, and the contact B relates to the case that the output of the model-based coding predictor is selected as a predicted image. A predicted image is obtained for each block element of an image.

When a block is outside of a head area of a person in an image, the switch 502 is connected to the contact A, in other words, the waveform coding predictor 2 is connected to an output. When a block is within a head area, the absolute sum (or the square sum) of the differences between each outputs and an input image is calculated, and the absolute sums of the two are compared with each other. If the absolute sum obtained by using the output of the waveform coding predictor 2 is smaller than that of the model-based coding predictor 3, the switch 502 is connected to the contact A. Otherwise, the switch 502 is connected to the contact B.

EMBODIMENT 2

Figures 4, 4A:
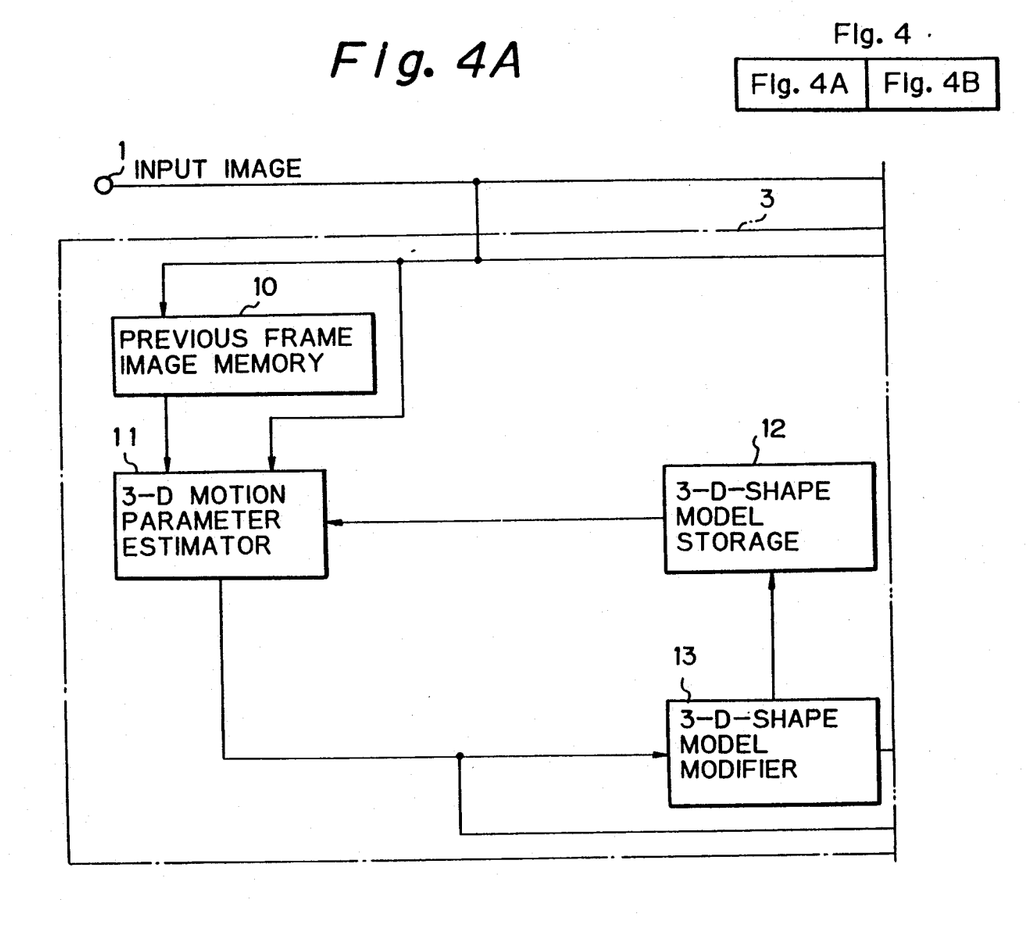
Figure 4B:
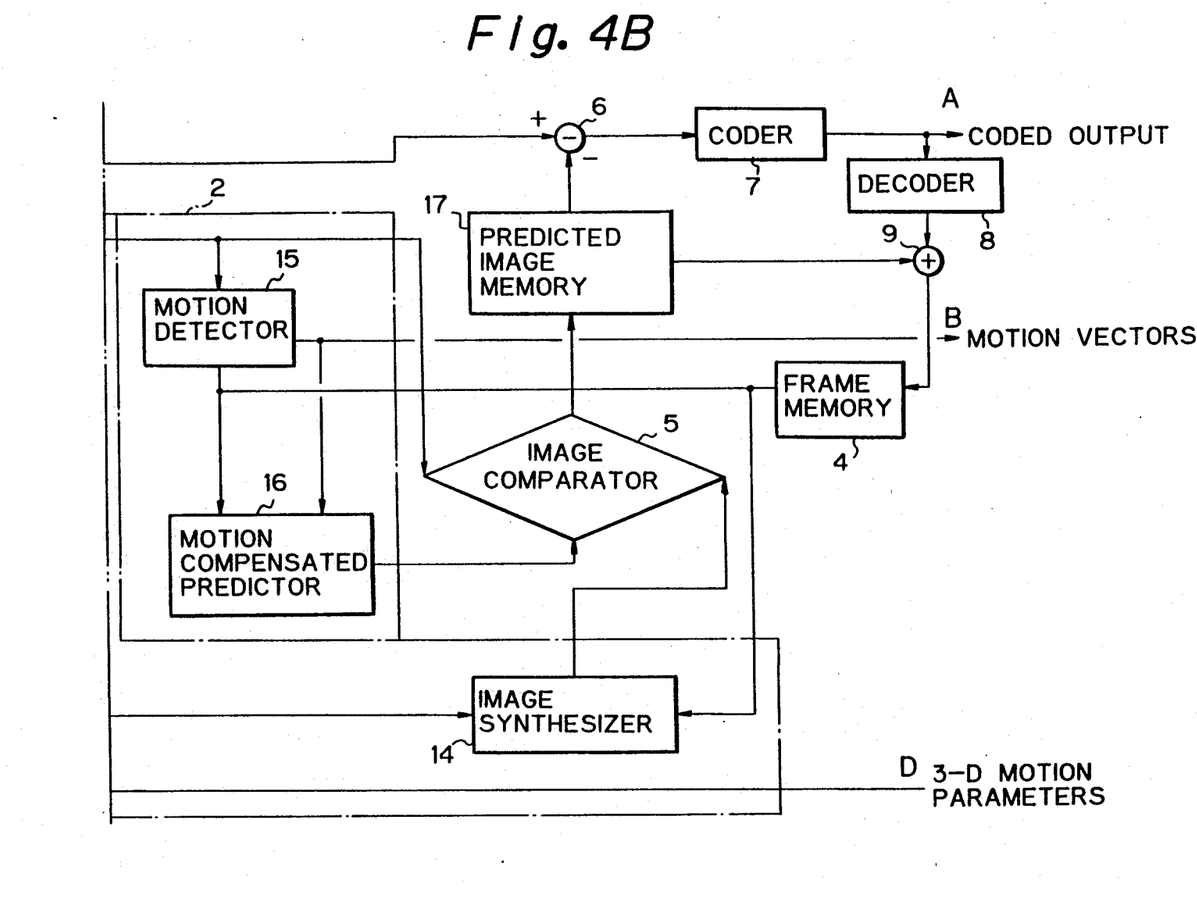

FIG. 4 shows a block diagram of the second embodiment of the present invention.

FIG. 4 shows the practical embodiment of the waveform coding predictor 2, and the model-based coding predictor in FIG. 1.

In the figure, the numeral 10 is an input image memory for storing a previous frame, 11 is a three dimensional motion parameter estimator, 12 is a three dimensional shape model storage, 13 is a three dimensional shape model modifier, 14 is an image synthesizer, 15 is a motion detector, 16 is a motion compensated predictor, 17 is a predicted image memory. Other members in FIG. 4 are the same as those in FIG. 1. The members 10, 11, 12, 13 and 14 in FIG. 4 relate to the model-based coding predictor 3 in FIG. 1, and the members 15 and 16 in FIG. 4 relate to the waveform coding predictor 2 in FIG. 1.

The motion detector 15 detects a motion vector for each block of a decoded image of a previous frame for an input image. The detection is effected by using a block matching method, or a gradient method (for instance, IE76-6, May, 1978, in the Institute of Electronics, Information and Communication Engineers in Japan, entitled "Motion compensation in inter-frame coding", and IE78-67, October 1978, in the Institute of Electronics, Information and Communication Engineers in Japan, entitled "Measurement of Motion and Velocity in Moving Picture Signal"). The motion compensated predictor 16 obtains motion compensated predicted image for an input image according to the motion vector obtained in the motion detector 15.

The three dimensional motion parameter estimator 11 estimates the three dimensional motion parameter of a head portion by using a current input image, and a three dimensional shape model of a head portion of a previous frame. For instance, the rotation parameter and/or the parallel shift parameter of a head portion are obtained.

The three dimensional shape model modifier 13 provides the three dimensional shape model of a head portion of the current input image, by using the output of the three dimensional motion parameter estimator 11 for modifying the three dimensional shape model of the head corresponding to the shape and the location of the head portion in the previous frame image. The three dimensional shape model thus obtained is stored in the three dimensional shape model storage 12.

The image synthesizer 14 combines the three dimensional shape model of the head corresponding to the shape and the location of the head portion of the current input image obtained in the output of the three dimensional shape model modifier 13, with the intensity information of the decoded image of the previous frame obtained in the output of the frame memory 4, so that the image of the head region of the input image is synthesized.

The motion detector 15 provides the output B which is the motion vector for waveform coding prediction, and the 3-D motion parameter estimator 11 provides the output C which is the 3-D motion parameters. Those outputs B and C are transmitted to a receiving side together with the coded output A.

The image comparator 5 effects the comparison between an input image and an output image of the image synthesizer 13, and the comparison between an input image and an output image of the motion compensated predictor 16 for each block, so that a predicted image is output according to the result of the comparisons. When a block element which is subjected to comparison is included in a head portion, an image which is closer to the input image is selected as a predicted image. When a block element subjected to comparison is not included in a head portion, the motion compensated predicted image which is the output of the motion compensated predictor 16 is selected as a predicted image. The output of the image comparator 5 is stored in the predicted image storage 17 as the predicted image of an input image.

The subtractor 6 provides the difference between an input image and a predicted image, as a prediction error.

The coder 7 effects the quantization and the coding for each block of the prediction error through orthogonal transform.

The decoder 8 effects the inverse quantization, and the inverse orthogonal transform. The adder 9 provides the sum of the output of the decoder 8 and the output of the predicted image storage 17, and the sum is stored in the frame memory 4.

The coded output A, the motion vector output B, and the 3-D motion parameter output C are transmitted to a receiving side.

Figure 5:
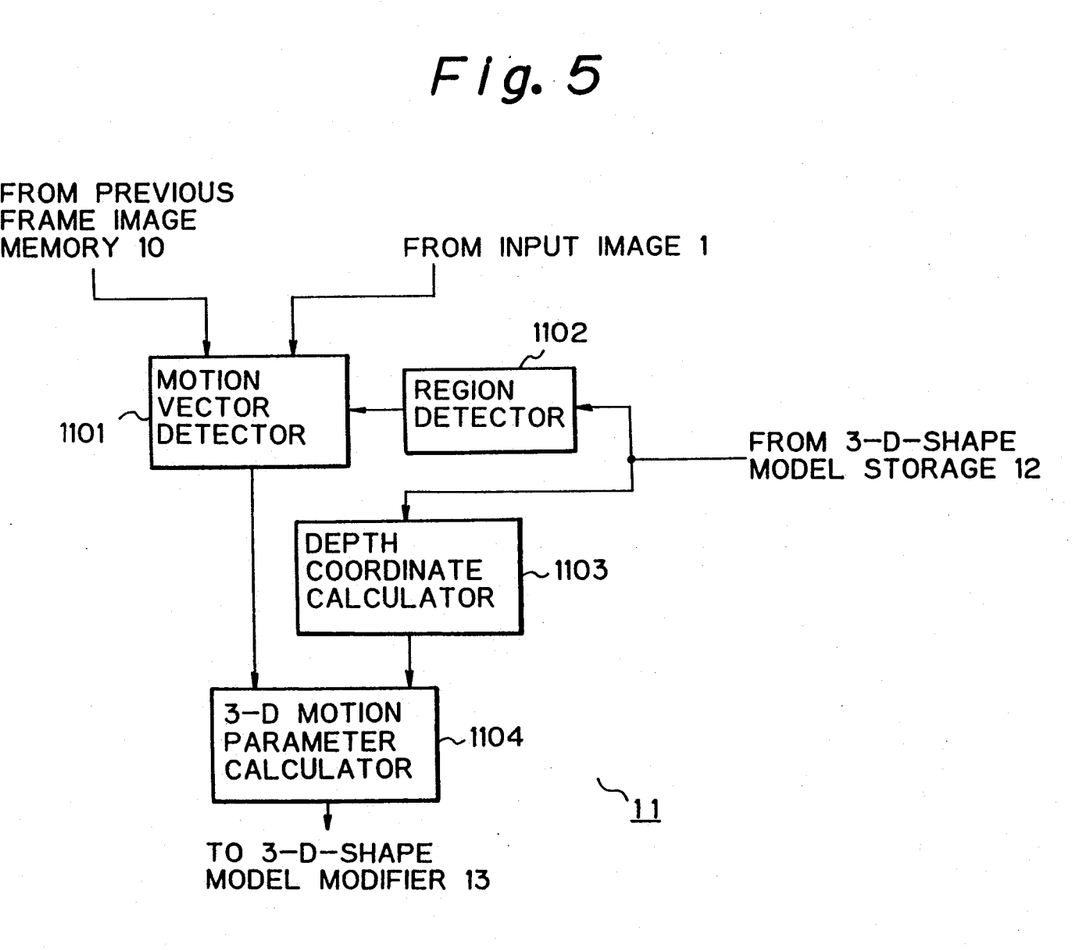
FIG. 5 is a block diagram of the three dimensional motion parameter estimator 11 in FIG. 4, FIG. 6AB is the block diagram of the third embodiment of the present hybrid coding system.

The estimation of the three dimensional motion parameters of a head portion is described. The estimation of three dimensional motion is described in IE89-3, April, 1989, in the Institute of Electronics, Information, and Communication Engineers in Japan, entitled "Estimation of 3-D motion of head from moving facial images". FIG. 5 shows a block diagram of the three dimensional motion parameter estimator 11. The region detector 1102 detects the region of the head portion by using the location information of the shape model of the head which is read out of the three dimensional shape model storage 13. The motion vector detector 1101 obtains the motion vector of the head portion of a previous frame to the current input image for each block element by using the output of the region detector 1102. The depth coordinate calculator 1103 obtains the depth of the head portion for each block element. The three dimensional motion parameter calculator 1104 estimates the three dimensional motion parameter of the head portion by using the motion vectors of the head portion obtained in the motion vector detector 1101, and the related depth.

EMBODIMENT 3

Figure 6A:
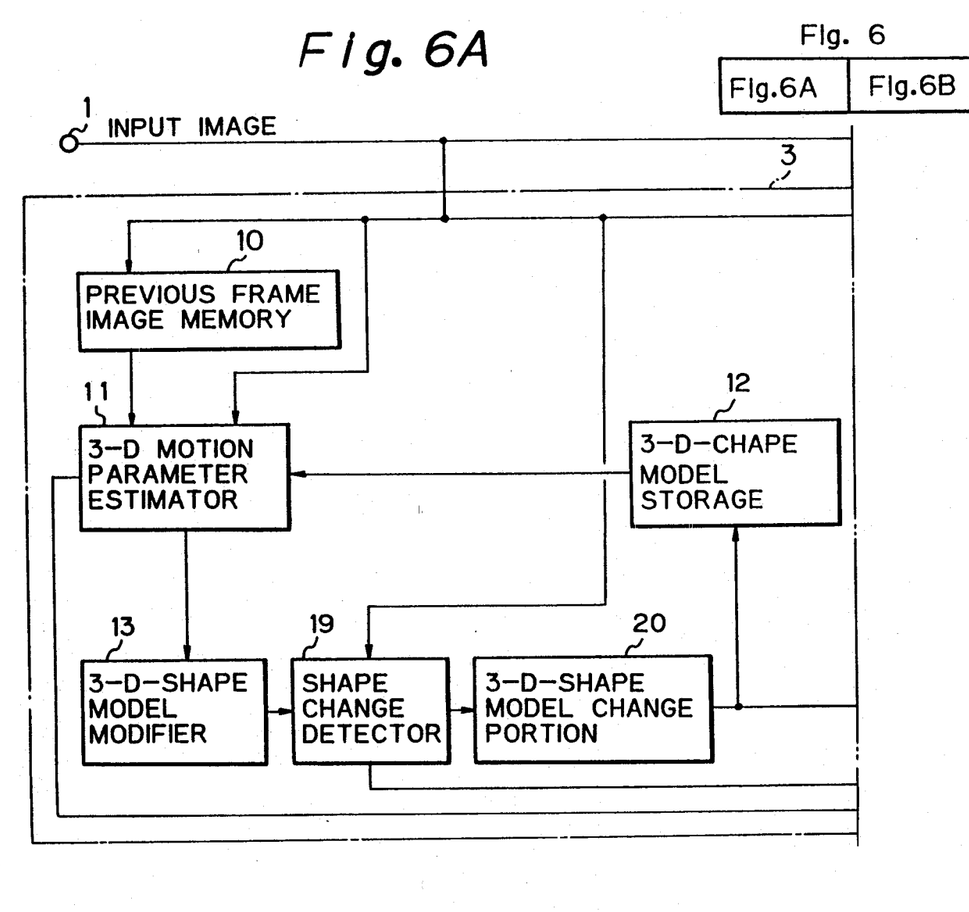
Figure 6B:
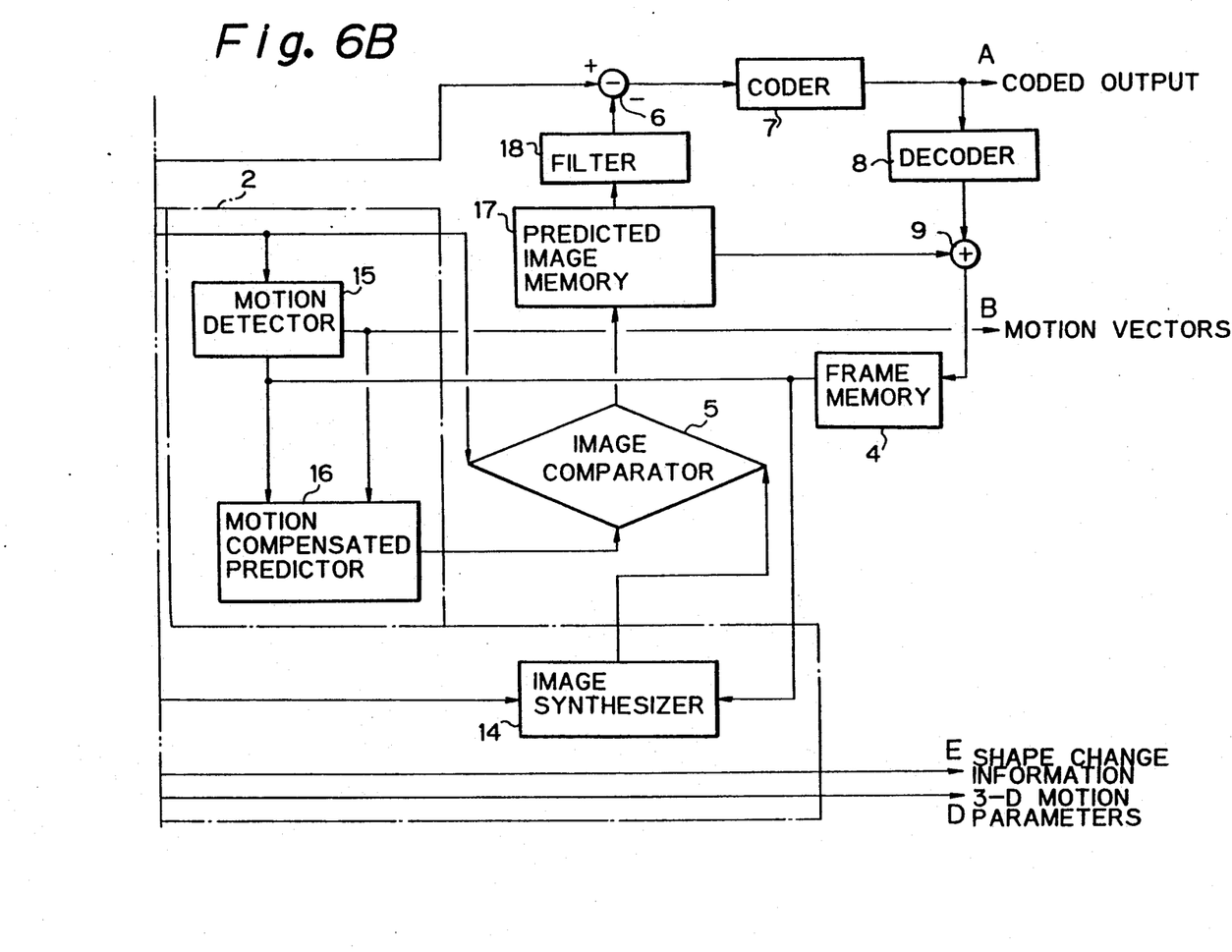

FIG. 6 shows a block diagram of the third embodiment according to the present invention. FIG. 6 shows the other embodiment of the waveform coding predictor 2 and the model-based coding predictor 3 in FIG. 1.

In the figure, the numeral 18 is a filter, 19 is a shape change detector, 20 is a three dimensional shape model change portion. Other members in FIG. 6 are the same as those in FIG. 4. The difference of the third embodiment from the second embodiment is the presence of the shape change detector 19 for detecting the shape change of the elements like an eye and/or a lip, and the three dimensional shape model change portion 20 for the modification of the three dimensional shape model based upon the output of the detector 19, at the output of the three dimensional shape model modifier 13. The detection of the shape change and the modification of the model are described in CV63-6, November, 1989, in the Institute of Electronics, Information and Communication Engineers in Japan, entitled "Model-based coding of a facial image based upon detection of shape change and estimation of three dimensional motion".

The low pass type filter 18 inserted at the output of the predicted image memory 17 is put on or off adaptively.

The final outputs to a receiving side are coded output A, motion vectors B, 3-D motion parameters D, and shape change information E which is provided by the shape change detector 19.

The filter is put on for a block element at the border of the motion compensated predicted image and the three dimensional motion compensated predicted image. The filter is put off for other image elements.

Figure 7:
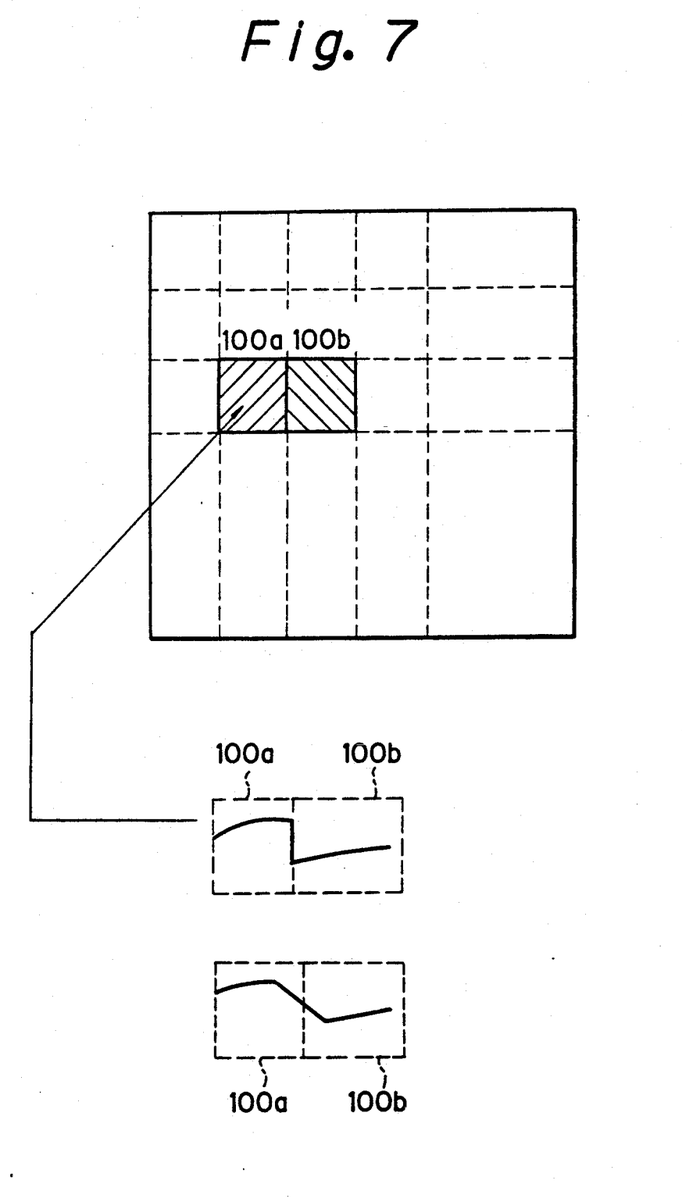
FIG. 7 shows the explanation of the filter portion 18 in FIG. 6.

In FIG. 7, when a block 100a is predicted through waveform coding prediction system, and the adjacent block 100b is predicted through 3-D model-based coding prediction system, the intensity might be discontinuous at the border between the blocks 100a and 100b. The filter 18 which is the lowpass type filter smoothes the intensity change at the border as shown in 100a' and 100b' in FIG. 7. When a block element has $8 \times 8$ ($=64$) pixels, the intensity at the border pixel in the blocks is modified so that the intensity of that pixel is defined according to the average of the second extreme pixel of the first block and the second extreme pixel of the second block.

As mentioned in detail, according to the present invention, a waveform coding image based upon motion compensated prediction, and a model-based coding image based upon three dimensional shape model are adaptively switched so that an excellent predicted image is obtained. The prediction efficiency for an input image is improved as compared with a prior art, and a decoded image quality is improved.

Also, the three dimensional motion of an object is estimated by using three dimensional shape model, and the synthesized image based upon said estimated image and the motion compensated predicted image are switched adaptively for each block. Thus, the prediction efficiency of an image for an input image is improved.

Further, the detection of shape change (shape change of an eye and/or a lip in case of a facial image), together with three dimensional motion detection of an object improves further the prediction efficiency.

Further, the adaptive application of a low pass type filter to a predicted image provides a smooth image removing the uncontinuity of intensity level of an image signal, and then, the image quality is improved.

The present invention is applied to a high efficiency coding of a moving image. In particular, the present invention is effective in a teleconference communication which transmits an image signal through a narrow band channel, and requires high information compression ratio.

From the foregoing, it will now be apparent that a new and improved image coding system has been found. It should be understood of course that the embodiments disclosed are merely illustrative and are not intended to limit the scope of the invention. Reference should be made to the appended claims, therefore, for indicating the scope of the invention rather than the specification.

What is claimed is:

1. A hybrid coding system for a moving image with combination of waveform coding prediction system and model-based coding prediction system comprising;
    an input terminal (1) for receiving a current input image which is subjected to coding and transmission,
    a frame memory (4) storing a previous image frame,
    a model-based coding predictor (3) for analyzing an object in the current input image, by using the image of the previous frame stored in said frame memory (4) the current input image, and a three dimensional shape model of the object, a wavefrom coding predictor (2) for predicting the image for the current input image by using waveform coding prediction system by using the current input image and an output of said frame memory (4), an image comparator (5) for obtaining first difference between the current input image and the output of said model-based coding predictor (3), and second difference between the current input image and the output of said waveform coding predictor (2), and providing an output image which relates to the smaller difference, a subtractor (6) for providing difference between the current input image and the output of said image comparator (5), a coding means (7) for encoding the output of said subtractor (6), a decoding means (8) for decoding the output of said coding means (7), an adder (9) for providing sum of the output of said decoding means (8) and output of said image comparator (5), and providing the sum to said frame memory (4), and an output terminal (A, B, C) for providing coded output (A) from said coding means (7), motion vectors (B) from said waveform coding predictor (2), and motion and shape change information (C) from said model-based coding predictor (3).

2. A hybrid coding system for a moving image with combination of waveform coding prediction system and model-based coding prediction system comprising;

an input terminal (1) for receiving a current input image, a frame memory (4) storing a previous image frame, a motion detector (15) for detecting motion of the current image for the previous frame stored in said frame memory (4), a motion compensated prediction means (16) for predicting an image for the current input image by using said previous frame, and motion vector detected by said motion detector (16), a three dimensional shape model storage (12) for storing three dimensional shape model relating to shape and location of the object of the previous image, a previous frame image memory (10) for storing a previous frame of the image, a three dimensional motion parameter estimator (11) for estimating the three dimensional motion parameter of the object by using the output of said three dimensional shape model storage (12) and the output of said previous frame image memory (10), a three dimensional shape model modifier (13) for modifying a model shape so that it corresponds to shape and location of the object of the current image, by applying said three dimensional motion parameter to the three dimensional shape model which corresponds to shape and location of the object in the previous frame image, an image synthesizer (14) for combining a predicted image corresponding to the object in the current image by attaching intensity information of the previous frame stored in said frame memory (4) to the output of said three dimensional shape model modifier (13), an image comparator (5) for providing a first difference between the input image and the output of said image synthesizer (14), and a second difference between the input image and the output of said motion compensated prediction means (16), and providing an output image which relates to the smaller difference, a predicted image memory (17) for storing the output of said image comparator (5), a subtractor (6) for providing difference between the input image and the output of said predicted image memory (17), a coding means (7) for encoding the output of said subtractor (6), and providing a coded output signal (A), a decoding means (8) for decoding the output of said coding means (7), an adder (9) for providing sum of the output of said decoding means (8) and the output of said predicted image memory (17), and storing the sum in said frame memory (4), and an output terminal (A, B, C) for providing coded output (A) from said coding means (7), motion vectors (B) from said motion detector (15), and three dimensional motion parameters (D) from said three dimensional motion parameter estimator (11).

3. A hybrid coding system for moving image according to claim 2, further comprising;

a shape change detection means (19) for detecting shape change of the object, and three dimensional shape change means (20) for changing the three dimensional shape model are provided at output of said three dimensional shape model modifier (13), a filter means (18) provided at the output of said predicted image memory (17) for smoothing the image at border of waveform coding predicted block and model-based coding predicted block, and an output terminal (E) for providing shape change information of the object at output of said shape change detection means (19).

* * * * *